United States Patent [19]

Kusumoto et al.

[11] Patent Number: 5,081,383

[45] Date of Patent: Jan. 14, 1992

[54] ROTOR FOR VEHICLE DYNAMO

[75] Inventors: Katsuhiko Kusumoto; Hideki Morikaku, both of Himeji, Japan

[73] Assignee: Mitsubishi Denki K.K., Tokyo, Japan

[21] Appl. No.: 467,427

[22] Filed: Jan. 19, 1990

[30] Foreign Application Priority Data

Jan. 20, 1989 [JP] Japan .................................. 1-5762[U]

[51] Int. Cl.⁵ .............................................. H02K 9/00
[52] U.S. Cl. ........................................ 310/59; 310/64; 310/194; 310/263
[58] Field of Search ............ 310/263, 194, 59, 60 R, 310/60 A, 64, 65, 45, 261

[56] References Cited

U.S. PATENT DOCUMENTS

| | | | |
|---|---|---|---|
| 3,283,188 | 11/1966 | Edick | 310/64 |
| 4,293,784 | 10/1981 | Zdaniewski | 310/45 |
| 4,350,908 | 9/1982 | Riffe | |
| 4,363,981 | 12/1982 | Laskaris | 310/45 |
| 4,471,247 | 9/1984 | Cotton | 310/45 |
| 4,506,180 | 3/1985 | Shizuka | 310/263 |
| 4,739,204 | 4/1988 | Kitamura et al. | |

FOREIGN PATENT DOCUMENTS

| | | | |
|---|---|---|---|
| 0015166 | 9/1980 | European Pat. Off. | 310/263 |
| 0270718 | 6/1988 | European Pat. Off. | |
| 2031242 | 11/1970 | France | |
| 2556147 | 7/1985 | France | |
| 0120810 | 9/1979 | Japan | 310/263 |
| 63-110940 | 5/1988 | Japan | |

Primary Examiner—R. Skudy
Attorney, Agent, or Firm—Sughrue, Mion, Zinn, Macpeak & Seas

[57] ABSTRACT

A rotor for a vehicle dynamo includes a field coil bobbin (6) provided with ventilation slots (6a) and a heat conductive material (7) provided between the bobbin and the field cores, whereby the heat radiation from the field coil is increased. The bobbin is provided with a cylindrical portion and a pair of opposed flange portions which include at least one ventilation opening extending from the cylindrical portion into the flange portions.

5 Claims, 6 Drawing Sheets

ROTOR FOR VEHICLE DYNAMO

BACKGROUND OF THE INVENTION

The present invention relates to rotors for vehicle dynamos.

A conventional rotor of a vehicle dynamo is shown in FIG. 4. The rotor consists of a rotary shaft 3; a pair of field cores 1 and 2 secured to the rotary shaft 3 such that pole claws 1a and 2a each extending inwardly from the free end thereof alternately mesh each other to form an annular channel; a bobbin 4 mounted in the annular channel; and a field coil 5 placed in the bobbin 4.

When rotation is transmitted to the rotary shaft 3 via a driving pulley (not shown) to rotate the rotor, with a field current supplied to the field coil 5 by a current collector (not shown), power is generated in a fixed coil (not shown) mounted around the rotor. The field coil 5 of the conventional dynamo suffers from high temperatures arising from the heat generation or reception. When the field coil is at high temperatures, the electrical resistance becomes high, making the field current and the magnetomotive force lower. As a result, the output current of the vehicle dynamo is lower than the output current at cold conditions as shown in FIG. 5. The output current in a high-temperature atmosphere is also lower than the output current in a normal-temperature atmosphere as shown in FIG. 6.

SUMMARY OF THE INVENTION

Accordingly, it is an object of the invention to provide a rotor for a vehicle dynamo, which is resistant to a decrease in output current in a high-temperature atmosphere without changing the frame or copper quantity of the vehicle dynamo.

According to the invention there is provided a rotor for a vehicle dynamo, which includes a field coil bobbin provided with a ventilation opening and a heat conductive material placed between the bobbin and the field core, whereby the heat radiation from the field coil is increased.

The above and other objects, features, and advantages of the invention will become more apparent from the following description when taken in conjunction with the accompanying drawings.

DESCRIPTION OF THE PREFERRED EMBODIMENT

Figure 1:
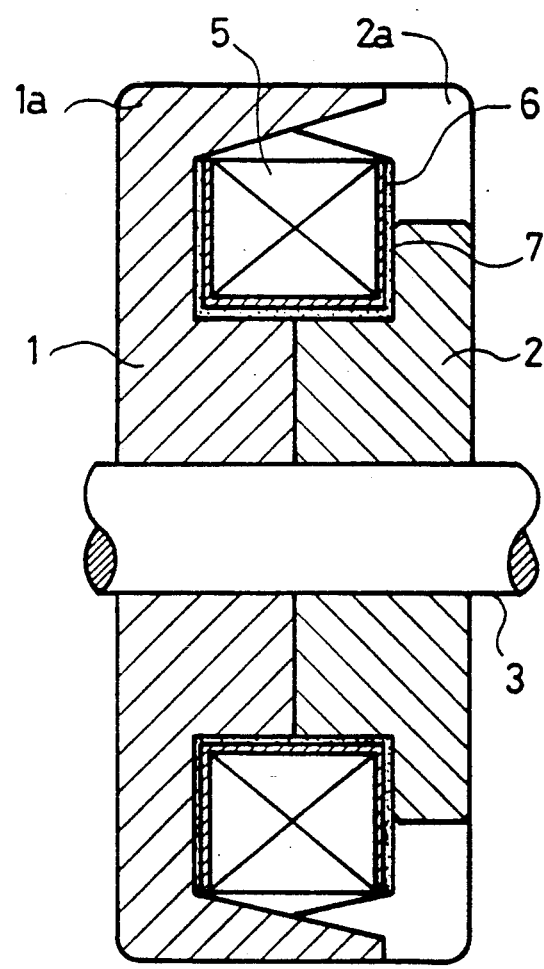
FIG. 1 is a sectional view of the rotor of a vehicle dynamo according to an embodiment of the invention.
Figure 2:
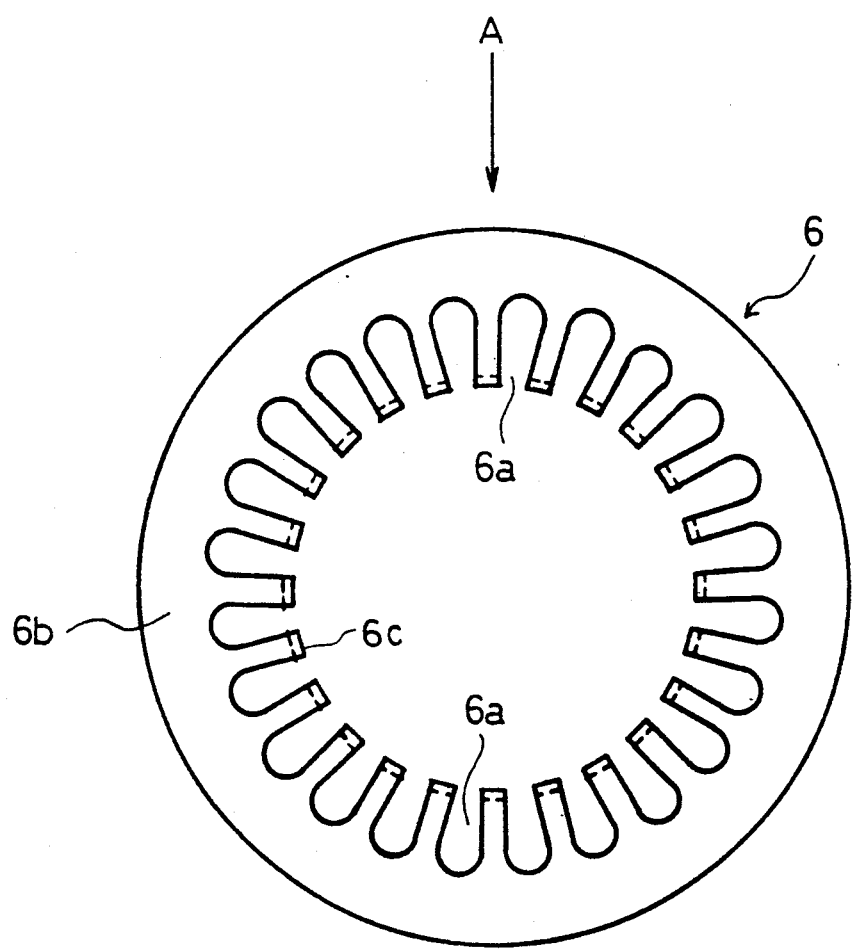
FIG. 2 is an elevational view of a bobbin useful for the rotor of FIG. 1.
Figure 3:
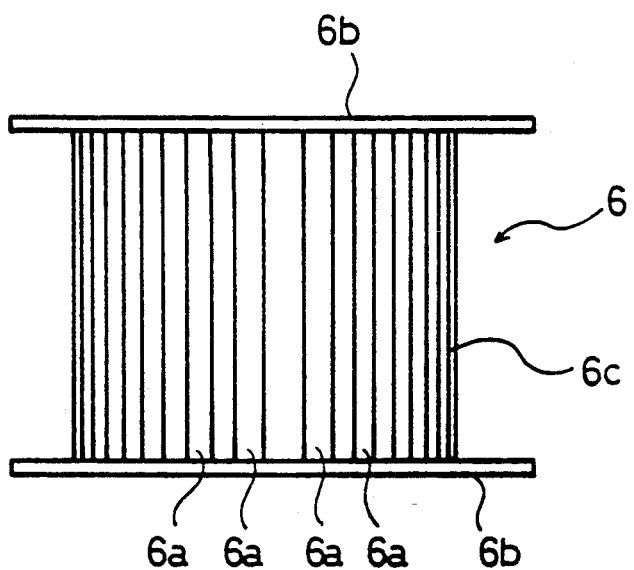
FIG. 3 is a top view of the bobbin of FIG. 2 looking at the bobbin from position A shown in FIG. 2.
Figure 4:
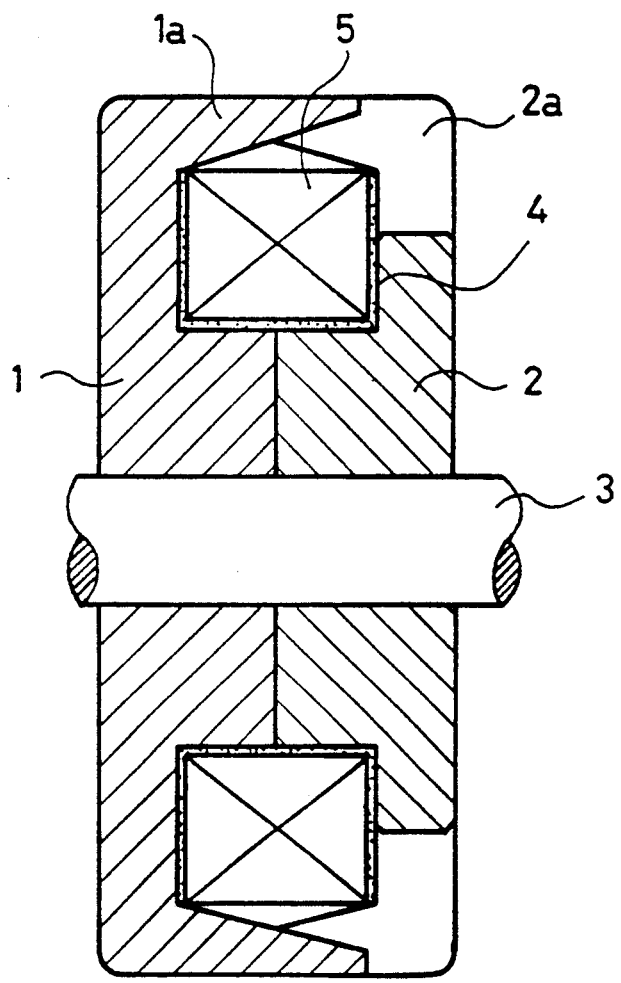
FIG. 4 is a sectional view of the rotor of a conventional vehicle dynamo.
Figure 5:
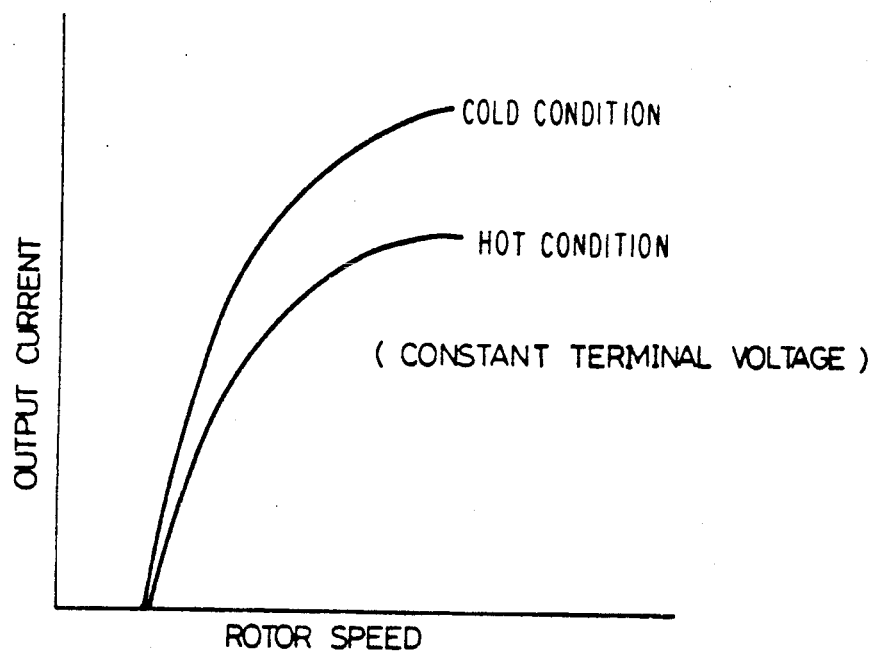
FIG. 5 is a graph showing the relation between the output current and the speed of the conventional rotor at cold and hot conditions.
Figure 6:
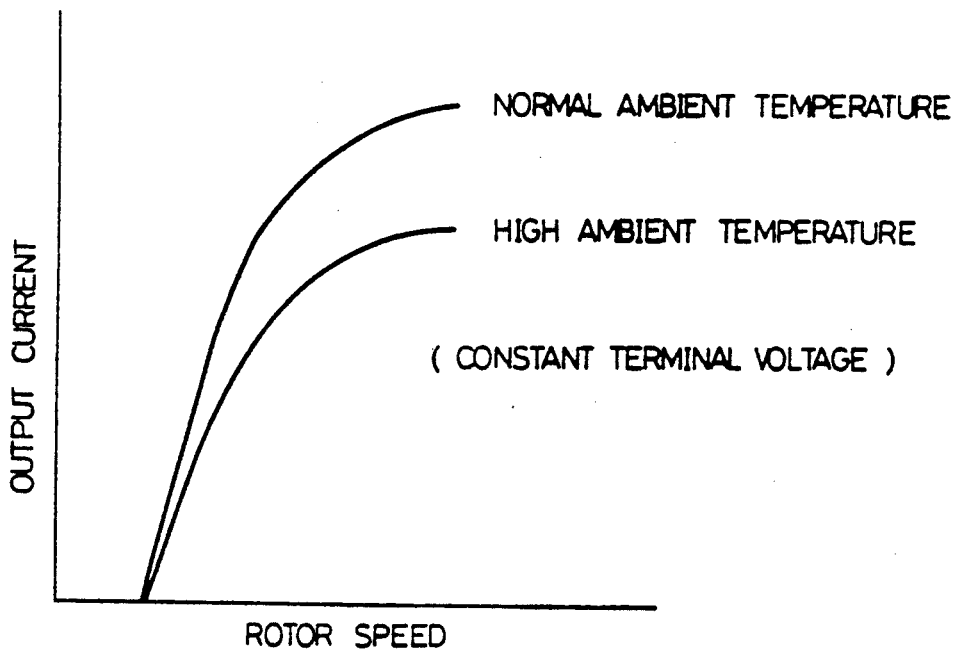
FIG. 6 is a graph showing the relation between the output current and the speed of the conventional rotor in different ambient temperatures.

In FIG. 1, the rotor of a vehicle dynamo consists of a rotary shaft 3; a pair of field cores 1 and 2 secured to the rotary shaft 3 such that pole claws 1a and 2a each extending inwardly from the free end thereof alternately mesh each other to form an annular channel; a bobbin 6 mounted in the annular channel; and a field coil 5 placed in the bobbin 6. As best shown in FIGS. 2 and 3, the bobbin 6 has a number of ventilation slots or openings 6a each having an axial portion serially and continuously extending in the axial direction on a cylindrical portion 6c and a pair of radial portions extending on opposed flange portions 6b in the radial direction from opposite ends of the axial portion. A heat conductive material 7 is placed between the bobbin 6 and the field cores 1 and 2 (FIG. 1).

The heat generated in or received by the field coil 5 is transmitted to the field cores 1 and 2 via the ventilation slots 6a or the bobbin 6 and the heat conductive material 7 between the bobbin 6 and the field cores 1 and 2. Consequently, an increase in temperature of the field coil 5 is controlled to minimize an increase in the electrical resistance so that a decrease in the output current due to the decreased field current at hot conditions or in a high atmosphere is minimized.

Figure 7:
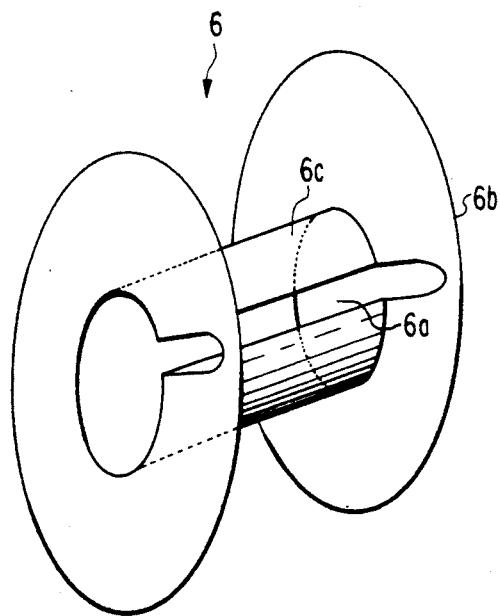
FIG. 7 is a perspective view of the bobbin showing a portion of a ventilation opening of the bobbin.

Alternatively, the ventilation slots 6a may be circular or polygonal openings. The ventilation openings 6a may be provided on either the flange portions 6b or the cylindrical portion 6c only. A portion of the ventilation openings 6a is shown in FIG. 7.

As has been described above, with the ventilation openings provided on the field coil bobbin and the heat conductive material placed between the bobbin and the field cores according to the invention, it is possible to minimize a decrease in magnetomotive force due to an increase in temperature of the field coil so that it is possible to minimize a decrease in the output current at hot conditions or in a high temperature atmosphere without changing the frame or copper quantity of the charging dynamo for vehicles.

We claim:

1. A rotor for a vehicle dynamo, comprising:
   a pair of field cores disposed such that a plurality of pole claws extending inwardly from a free end of each field core alternately mesh with each other to form an annular channel;
   a bobbin having a cylindrical portion and a pair of opposed flange portions, extending from said cylindrical portion in a radial direction which is placed in said annular channel for receiving a field coil and which is provided with a ventilation opening thereon; and
   a heat conductive material placed between said bobbin and said field cores, wherein said ventilation opening is formed serially and continuously extending from said cylindrical portion into said opposed flange portions.

2. The rotor of claim 1, wherein said ventilation opening is composed of a plurality of slots each consisting of an axial portion extending in an axial direction on said cylindrical portion and a pair of opposed radial portions extending on said flange portions in the radial direction from opposite ends of said axial portion.

3. The rotor of claim 1, wherein said ventilation opening is provided on said flange portions.

4. The rotor of claim 1, wherein said ventilation opening is provided on said cylindrical portion.

5. The rotor of claim 1, wherein said ventilation opening is provided on both said flange portions and said cylindrical portion.

* * * * *